UNITED STATES PATENT OFFICE.

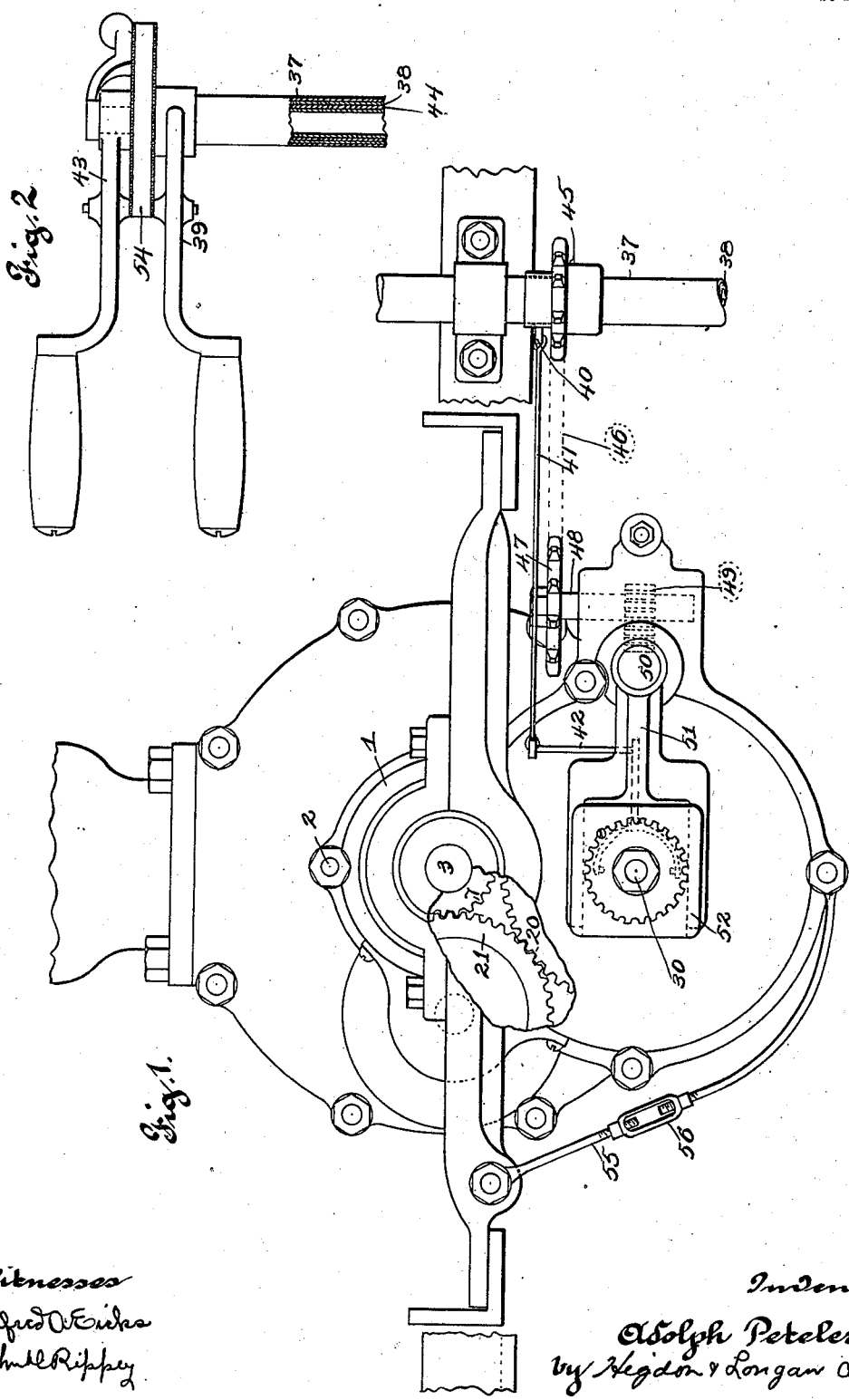

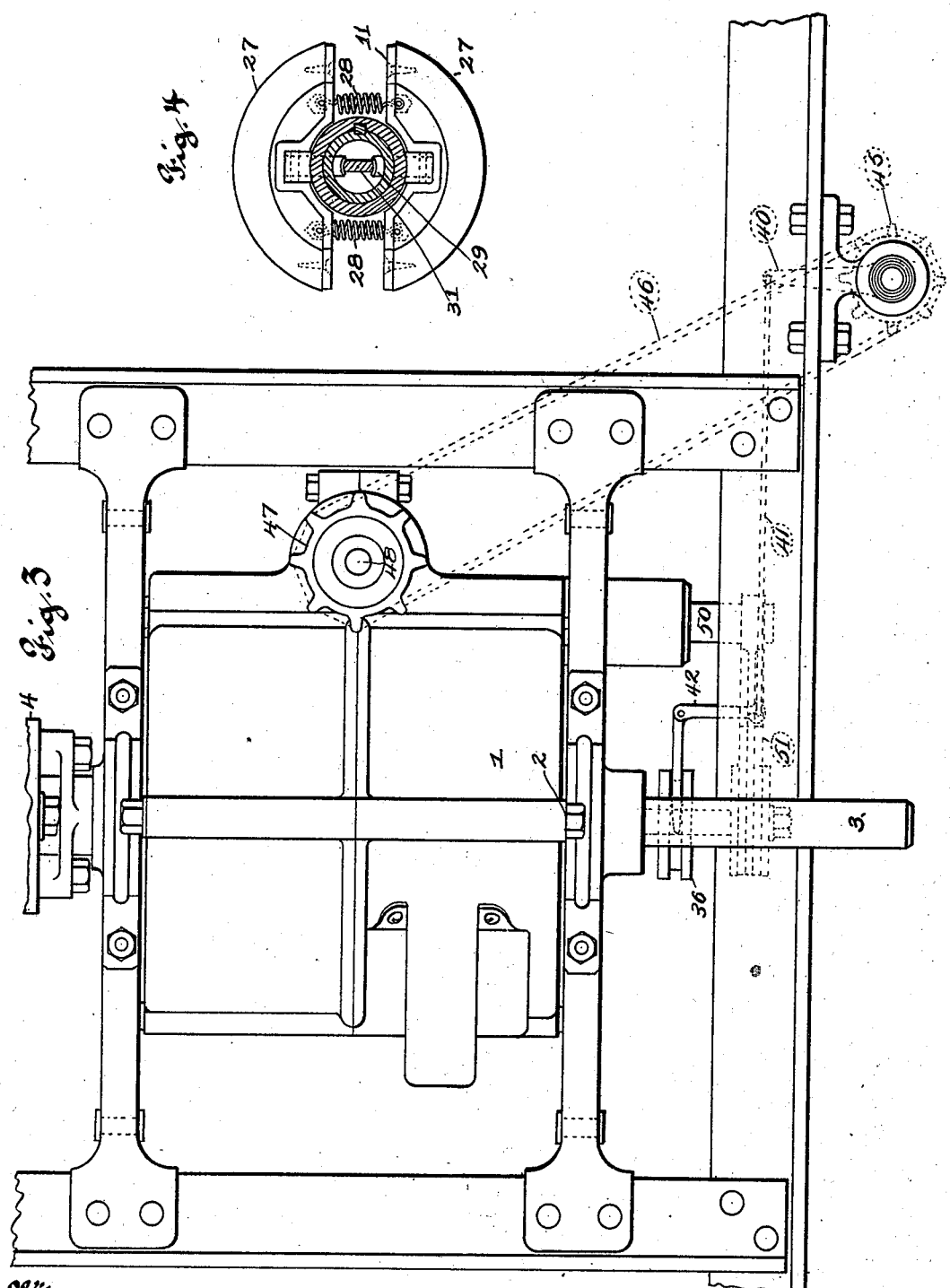

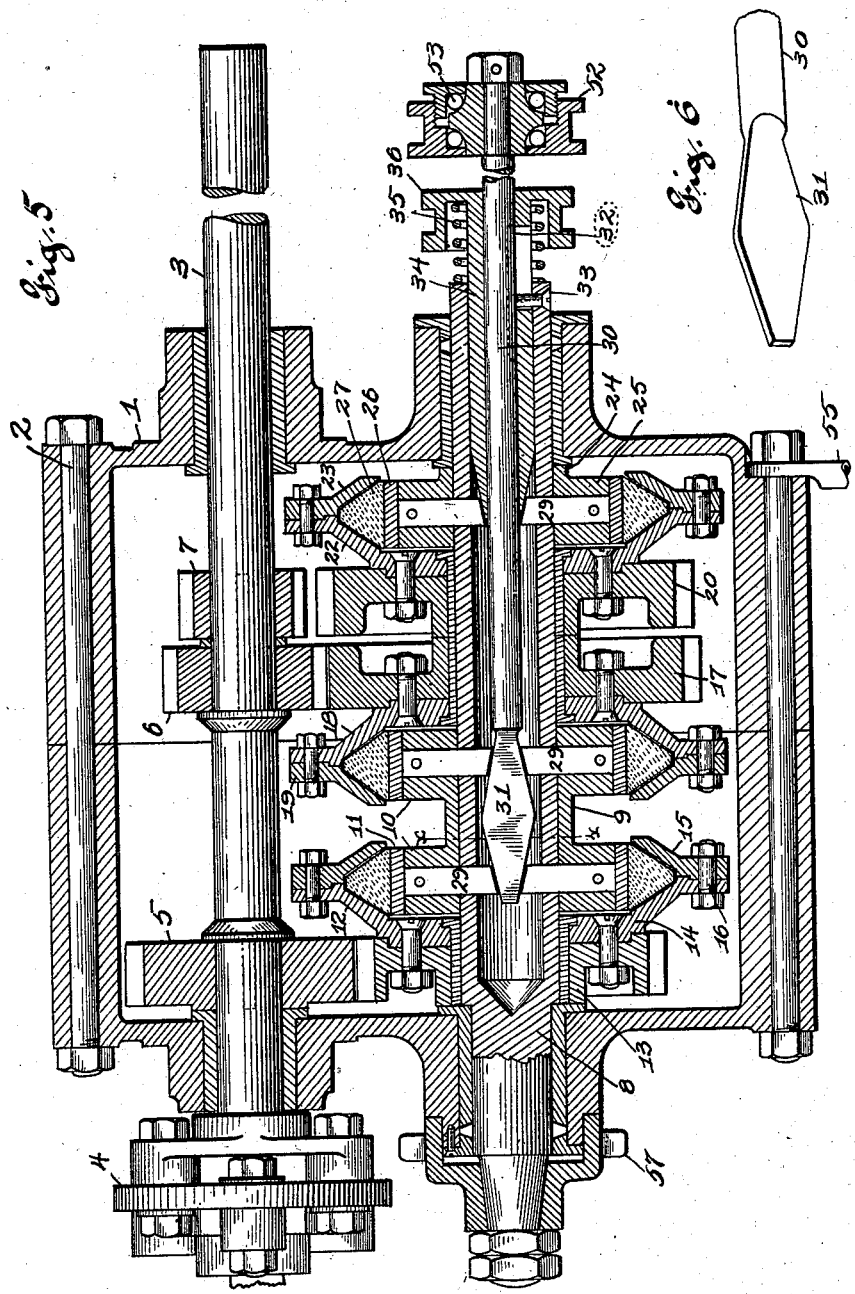

ADOLPH PETELER, OF ST. LOUIS, MISSOURI.

VARIABLE-SPEED GEARING.

SPECIFICATION forming part of Letters Patent No. 724,202, dated March 31, 1903.

Application filed November 1, 1901. Serial No. 80,740. (No model.)

*To all whom it may concern:*

Be it known that I, ADOLPH PETELER, residing at St. Louis, Missouri, have invented certain new and useful Improvements in Variable-Speed Gearing, of which the following is a full, clear, and exact description, reference being had to the accompanying drawings, forming a part hereof.

This invention relates to a variable-speed gearing for automobiles; and it consists of the novel construction, combination, and arrangement of parts hereinafter shown, described, and claimed.

The object of this invention is to provide an improved gearing for automobiles whereby the vehicle may be propelled forward at various speeds and a suitable mechanism whereby the vehicle may be reversed and all the various gears being in constant mesh with means whereby they may be made rigid upon the driven shaft to propel the vehicle in the direction desired.

Another object is to provide a variable-speed gearing with friction-clutches connected to the driven shaft and means located within the shaft for connecting the clutch to the gearing, so that the shaft will be rotated.

Various other objects and improvements will appear from the following detailed description, special reference being had to the drawings, in which—

Figure 1 is a side view of the frame which incloses my improved gear. Fig. 2 is a detailed view showing the handles by which the different clutches may be applied and also shows the tubular shafts mounted one within the other for controlling the various clutches. Fig. 3 is a plan view of the complete invention. Fig. 4 is a cross-sectional view of the driven shaft and a part of a friction-clutch, taken approximately on the line *x x* of Fig. 5. Fig. 5 is a cross-section showing the arrangement and construction of the various parts. Fig. 6 is a perspective view of the member which applies the friction-clutch.

In the construction of my improved variable-speed gearing I provide a suitable frame 1, composed, preferably, of two parts held together by means of long bolts or rods 2 and provided with bearings for supporting the drive-shaft and driven shaft, the latter being connected to the axle of the vehicle in some suitable manner, so that the power may be transmitted thereto. 3 indicates the drive-shaft, which is preferably supported near the upper side of the frame 1 and is provided on one end with a flexible coupling 4, which will allow more or less vibration or movement of the said shaft without affecting its operation.
Herein I do not describe this flexible coupling in detail, since I base no separate claims thereon in this application, having made the same the subject of a separate application, filed February 27, 1902, serially numbered 95,981.

Within the frame 1 a high-speed gear-wheel 5 is fixed upon the drive-shaft 3, preferably near one side of the said frame, and also a low-speed gear-wheel 6 is mounted upon the said shaft, as is also the rearward-propelling gear-wheel 7.

Within the bearings formed near the lower side of the frame 1 is supported the driven shaft 8 in tubular form, as may be clearly seen in Fig. 5. Fixed upon the shaft 8, between the plates of the forward-propelling gears 5 and 6, is a sleeve 9, integral with each end of which is an enlargement 10, and upon each of the enlargements 10 are carried substantially semicircular metallic plates or frames 11, which, however, are free to move away from the said enlargements 10. A semicircular friction member 12 is connected to each of the plates 11, and their outer surfaces are beveled, as may be seen in Fig. 5, making them substantially wedge-shaped in cross-section. The object of this is to afford greater friction-surface than could be obtained by a flat member, and I have also found that a wedge-shaped member operating within a groove affords a better bite than does a flat member bearing upon another. Furthermore, by forming the driven clutch member with oppositely-inclined faces fitting in a concentric V-shaped groove it is obvious that no special means are necessary to hold the driven clutch member against longitudinal displacement.

Mounted loosely upon the shaft 8 and in constant mesh with the high-speed gear-wheel 5 is a gear 13, to the inner side of which is attached a circular plate 14, which forms one-half of the outer friction member inclosing the friction members 12. The other portion of the outer friction member consists of a ring 15, attached to the plate 14 by means of suitable bolts or other fastening devices 16.

It will be seen that the two members 14 and 15 form an internal groove, within which the members 12 of the friction-clutch operate, but are out of contact therewith unless the clutch is applied, in which case the inner members 12 of the friction-clutch are actuated outwardly, so that they bear against the said members 14 and 15, and thereby connect the gear-wheel 13 thereto and making the shaft 8 turn.

17 indicates a gear-wheel loosely mounted upon the shaft 8 and in constant mesh with the gear 6. This gear is also provided with a plate 18, identical in shape with the plate 12, above described, and to which is attached a ring 19, corresponding to the ring 15. The said plates 18 and 19 form the outer members of the friction-clutch, by which the gear-wheel 17 may be made rigid upon the shaft 8 by actuating the inner members 12 of the said clutch outwardly to form frictional contact with the outer members. The means by which this is accomplished will hereinafter be described.

20 indicates a rearward-propelling gear, which is mounted loosely upon the shaft 8 adjacent to the low-speed gear 17 and which is connected to the gear 7 by means of an intermediate gear-wheel 21, so that the said gear 20 will be driven in the opposite direction from that in which the gears 13 and 17 will be rotated. The said gear-wheel 20 is also provided with a friction-clutch identical in construction with those above described and consisting of the plate 22, carrying a ring 23. A sleeve 24 is mounted upon the shaft 8 adjacent to the plate 22 and is provided with an enlargement 25, which carries members 26 and 27, corresponding to the members 11 and 12, above described, and which operate within the groove provided by the plate 22 and the ring 23. The inner members of the various friction-clutches, as above described, are substantially semicircular in side elevation, as clearly shown in Fig. 4, and the two members of each clutch are connected together by the retraction coil-springs 28, so that they will automatically be drawn out of contact with the friction-clutches whenever they are released.

Within each clutch are two radially-movable rods 29, the outer ends of which project into openings formed in the inner friction members, as shown by dotted lines in Fig. 4, and which thereby form guides for the said members and also serve to force them outwardly, as will presently appear.

The inner ends of the rods 29 of the forward-propelling clutches are beveled, as shown in Fig. 5, and the said rods project some distance into the hollow shaft 8.

30 indicates a rod which projects into the shaft and which is flattened on its inner end, as indicated by 31, and the said flattened portion is substantially in the shape of a double wedge, being the largest at its middle and tapering gradually toward each end. The extreme inner end of the said flattened portion projects between the inner ends of the rods 29, and when forced inwardly the said flattened portion pushes the rods 29 outwardly, and thereby sets the clutch by bringing the inner members 12 into frictional contact with the outer members 14 and 15. By moving the rod 30 in the opposite direction the other forward-propelling clutch will be applied and the inner clutch will be instantly released, the springs 28 contracting and drawing the inner members of the clutch out of contact of the outer members, and thereby allowing the gear 3 to turn loosely upon the shaft 8.

A slot 32 is formed in the rod 30. A screw 33 is threaded through the shaft 8 and projects into the said slot, and thereby forms a guide for the said rod and also retains it in position, so that the edges of the flat portion 31 will bear against the ends of the rods 29.

By releasing the screw 33 the rod 30 can be turned to allow the flat portion 31 to move between the ends of the rods 29 and permit the said rod to be removed for repairs or other purposes.

34 indicates a sleeve which is mounted to slide upon the rod 30 within the shaft 8, and the inner end of the said sleeve is conical and projects between the inner ends of the rods 29 of the rearward-propelling clutch and the shaft 8. From this it will be seen that when the sleeve 34 is forced inwardly the rods 29 of the rearward-propelling clutch will be forced outwardly to set this clutch. A spring 35 is interposed between the end of the shaft 8 and the groove enlargement 36, which is integral with the outer end of the said sleeve 34 and serves to actuate the latter outwardly when released.

37 indicates a tubular bearing, which is supported in a suitable position relative to the side of the vehicle, and within this bearing is mounted a number of tubular shafts, the outer one 38 of which is connected to a handle 39, and attached to the lower end of this shaft 38 is an arm 40. A rod 41 connects the arm 40 with one arm of the bell-crank lever 42, pivotally supported by some portion of the frame of the vehicle, and the other arm of the said lever is provided with a fork which incloses the groove enlargement 36, and thereby affords means for shifting the sleeve 35 to apply the rearward-propelling clutch. A handle 43 is connected to the upper end of the next inner one, 44, of the tubular shafts, and to the lower end of this shaft is connected a sprocket-wheel 45, from which leads a chain 46, the said chain being also passed around a sprocket-wheel 47, supported upon the shaft 48. A gear 49 is mounted upon the shaft 48 and meshes with a rack formed upon a shaft or rod 50, supported to slide in the bearings connected to some part of the frame 1.

A bifurcated arm 51 leads from the rod or shaft 50 and incloses a groove-pulley 52, mounted upon the outer end of the rod 30 and provided with ball-bearings 53 to reduce the friction. It will thus be seen that by shifting the handle or lever 43 the shaft 44 will be rotated, which by means of the sprocket-wheel 45, the chain 46, and the other connections above described will move the shaft or rod 50 and by means of the arm 51 operate the rod 30 and bring the flattened portion 31 between the inner ends of the rods 29, which will set one of the forward-propelling friction-clutches. Any known devices, such as tooth-plate 54, may be made use of to hold the handles or levers 43 after they have once been operated. As may be seen in Fig. 1, the drive-shaft 3 supports the frame 1, and the said frame 1 is held stationary by means of the rods 55, connected by a turnbuckle 56, whereby the frame may be slightly moved to take up any slack which may be in the chain connecting the driven shaft 8 with the vehicle.

57 indicates a sprocket-wheel which is mounted upon the shaft 8 and from which a chain leads to a similar sprocket mounted upon the axle of the vehicle, so that the power may be transmitted from the driven shaft to the vehicle.

It will be seen from the above description that the various gears are in constant mesh and are never shifted upon the shaft, but that the friction-clutches, which are adjacent to the gears, are applied to connect the gears to the shaft. It will also be seen that there is no longitudinal shifting of any of the parts, but that they are actuated outwardly, and hence no large frame is required to accommodate these parts, but that they may be located close together, thereby rendering them stronger and efficient.

It will be observed by referring to Figs. 1 and 3 that the frame 1 is supported by the upper bearings, in which the drive-shaft 3 is mounted, and that these bearings serve as pivots, so that the said frame 1 can be revolved thereon without interfering with the relative positions of the various parts comprising the gearing, which is located within the said frame 1. This will allow the frame to be turned to any position desired and will also permit its movement to take up any slack which may be in the chain connecting the driven shaft 8 with the vehicle-axle. These features will be found of special advantage, for the reason that they overcome many difficulties which have heretofore been encountered in this class of inventions.

For the sake of distinction the driven clutch member may be described as being divided, the sections thereof being held inwardly by springs, which springs yield and permit the sections of the divided clutch member to move radially in an outward direction to engage the V-shaped concentric groove of the driving clutch member.

By reason of the differences in diameters of the several trains of gears it is obvious that in propelling the vehicle forward the driven shaft may be locked at different speeds—to wit, when the rod 30 is pushed inwardly to lock the gear 13 to the driven shaft the driven shaft will be rotated at a high speed, and when the rod 30 is moved outwardly, so as to lock the gear 17 to the driven shaft, (the gear 13 by this movement being released,) the driven shaft will be rotated at a slow speed.

In connecting the reversing-train to the driven shaft I prefer to use a train of gearing which will still further reduce the speed of rotation from the driving to the driven shaft.

I am aware that many minor changes in the construction, arrangement, and combination of the several parts of my gearing may be made and substituted for those herein shown and described without in the least departing from the nature and principle of my invention.

I claim—

1. In a variable-speed gearing for automobiles, the combination with a supporting-frame, of a driving-shaft journaled in said frame, a casing pivoted on said driving-shaft and having its axis of movement coincident therewith, a driven shaft mounted in said casing, a plurality of driving-gears of different diameters fixedly mounted on the driving-shaft within the casing, a plurality of driven gears loosely mounted on the driven shaft, clutch members carried by each of the driven gears, divided clutch members carried by the driven shaft, and means arranged in the interior of the driven shaft for forcing the sections of the divided clutch members carried thereby into engagement with the clutch members on the driven gears; substantially as described.

2. In a variable-speed gearing for automobiles, the combination with a driving-shaft, of a supporting-frame in which the same is journaled, a casing mounted on said driving-shaft and movable thereabout, gears of different diameters arranged within the casing and fixed to the driving-shaft, a driven shaft carried by said casing and having loosely-mounted gears in mesh with the driving-gears, a clutch member carried by each of the driven gears, a series of divided clutch members arranged on the driven shaft and coöperating with said driven clutch members, an idler interposed in one train of gears for reversing the direction of rotation of the driven shaft, and independently-operable mechanism located in the driven shaft for forcing the divided clutch members outwardly and causing said shaft to be rotated forwardly at different speeds or backwardly through the idle gear at a slow speed; substantially as described.

3. In an apparatus of the character described, the combination with a driving-shaft and its gear, of a driven shaft, a gear loosely mounted thereon, a sleeve on said driven shaft, said driven gear having an internal, concentric, V-shaped groove, the parts thereof being separable, a clutch member carried by said sleeve and divided into sections, means for holding said sections yieldingly away from the walls of said V-shaped groove, radially-disposed plungers coöperating with the different sections of the divided clutch members, seats for said plungers, and a longitudinally-movable rod formed with inclined faces, said rod being located in the driven shaft for actuating the plungers; substantially as described.

4. In an apparatus of the character described, the combination with a driving-shaft and its gear, of a driven shaft, a gear loosely mounted thereon, said driven gear being provided with an internal concentric V-shaped groove, a sleeve mounted on the driven shaft and provided with seats, yokes or saddles arranged upon said seats and carrying inclined clutch-faces designed to coöperate with the V-shaped groove, tension-springs connected to the ends of the saddles for holding said parts upon the sleeve and out of contact with the V-shaped groove, plungers extending within the driven shaft, and means located in said driven shaft for operating the plungers; substantially as described.

5. In an apparatus of the character described, the combination with a driving-shaft and its gear, of a driven shaft, a gear loosely mounted thereon, said driven shaft being provided with a concentric V-shaped groove, a sleeve on the driven shaft, a divided clutch member whose sections are mounted upon said sleeve, the friction-faces of said sections extending into said groove and normally out of contact therewith, plungers connected to the sections of said divided clutch member and extending inwardly into the driven shaft, a rod having inclined faces arranged in said driven shaft, and means for moving said rod longitudinally, whereby said faces engage said plungers and force the sections of the clutch member outwardly; substantially as described.

6. In a variable-speed gearing for automobiles, the combination with a drive-shaft and its driving-gears, of a tubular driven shaft, driven gears loosely mounted upon the driven shaft, each of the driven gears being provided with a concentric V-shaped groove, segmental clutch members carried on the driven shaft, tension-springs connected to both clutch members at each side of said driven shaft, holding said clutch members normally free from engagement with said V-shaped grooves of the driven gears, plungers actuating said clutch members, seats for said plungers, and means located within the driven shaft for actuating the plungers and the divided clutch members by direct radial thrust whereby any one of the driven gears may be locked to rotate the driven shaft; substantially as described.

In testimony whereof I affix my signature in presence of two witnesses.

ADOLPH PETELER.

Witnesses:
ALFRED A. EICKS,
JOHN D. RIPPEY.